United States Patent [19]

Takado et al.

[11] Patent Number: 5,114,522
[45] Date of Patent: May 19, 1992

[54] METHOD FOR PRODUCING AN AUTOMOBILE BUMPER

[76] Inventors: Yutaka Takado, 5-6, Shin-machi, Kanagawa-ku, Yokohama-shi, Kanagawa-ken; Masayuki Yamazaki, 8-231, Shimoda-cho 5-chome, Kohoku-ku, Yokohaya-shi, Kanagawa-ken; Takashi Mikami, 23-48, Izumihon-machi 3-chome, Komae-shi, Tokyo; Tetsuo Tomiyama, 1418-3 Shukugawara, Tama-ku, Kawasaki-shi, Kanagawa-ken, all of Japan

[21] Appl. No.: 159,967

[22] PCT Filed: Jun. 30, 1987

[86] PCT No.: PCT/JP87/00448
§ 371 Date: Mar. 28, 1988
§ 102(e) Date: Mar. 28, 1988

[87] PCT Pub. No.: WO88/00127
PCT Pub. Date: Jan. 14, 1988

[30] Foreign Application Priority Data

Jun. 30, 1986 [JP] Japan ................. 61-154856

[51] Int. Cl.⁵ .............. B29C 49/22; B29C 49/04
[52] U.S. Cl. ............... 156/245; 156/244.14; 156/285; 156/287; 264/515; 264/516; 293/122; 425/503
[58] Field of Search ............... 264/516, 510, 511, 515, 264/513; 293/107, 122, 120; 156/245, 244.14, 285, 287; 425/503

[56] References Cited

U.S. PATENT DOCUMENTS

| | | | |
|---|---|---|---|
| 3,140,329 | 7/1964 | Nutting | 264/515 |
| 3,287,198 | 11/1966 | Battenfeld | 156/518 |
| 3,744,656 | 7/1973 | Schiemann | 264/515 X |
| 4,066,285 | 1/1978 | Hall et al. | 293/120 |
| 4,323,411 | 4/1982 | Uhlig | 264/515 |
| 4,586,738 | 5/1986 | Butler et al. | 293/107 |
| 4,634,566 | 1/1987 | Schlenz | 264/516 |
| 4,652,032 | 3/1987 | Smith | 293/120 |
| 4,664,958 | 5/1987 | Jones | 264/515 |
| 4,715,473 | 12/1987 | Tschudin-Mahrer | 264/516 |
| 4,721,593 | 1/1988 | Kowal | 264/516 |
| 4,724,115 | 2/1988 | Freeman | 264/516 |
| 4,824,504 | 4/1989 | Kagata | 264/516 X |

FOREIGN PATENT DOCUMENTS

| | | | |
|---|---|---|---|
| 2541765 | 3/1977 | Fed. Rep. of Germany | 264/516 |
| 56-126133 | 10/1981 | Japan . | |
| 56-136331 | 10/1981 | Japan | 264/516 |
| 57-178724 | 11/1982 | Japan | 264/516 |
| 58-45921 | 3/1983 | Japan | 264/516 |
| 60-82323 | 5/1985 | Japan | 264/516 |
| 61-144328 | 7/1986 | Japan | 264/516 |

*Primary Examiner*—Jan H. Silbaugh
*Assistant Examiner*—Catherine Timm
*Attorney, Agent, or Firm*—Armstrong, Nikaido, Marmelstein, Kubovcik & Murray

[57] ABSTRACT

A method for producing a high shock-absorbing automobile bumper with a smooth outer surface. The method includes the steps of loading a preformed surface skin member into a blow mold, and then blowing a parison in the mold so that the blown parison is bonded to the surface skin member. The result is a hollow cushioning body firmly bonded to the surface skin member.

2 Claims, 3 Drawing Sheets

METHOD FOR PRODUCING AN AUTOMOBILE BUMPER

TECHNICAL FIELD

This invention relates to a method for producing an automobile bumper.

BACKGROUND ART

An automobile bumper is usually made of an exterior surface skin, a cushioning body to absorb shocks, and a reinforcement adapted to reduce elastic deformation. The bumper is made of metal or plastics. The metal bumper is heavy and is permanently deformed when hit. The plastics bumper is free of such a disadvantage.

While an injection-molded plastics bumper has a smooth surface, it has a lower impact-resistance and thus needs a heavy, stiff reinforcement, making it difficult to reduce the weight of the entire bumper.

In contrast, a plastics bumper produced by blow molding is excellent in impact resistance (absorption of impact force); however, it has a rather rough surface, because it is made of a low-flow synthetic resin to provide drawdown resistance during the blow molding, and also because its blow pressure applied on the mold wall is so low that the contours of the mold are not fully transferred to the resin.

DISCLOSURE OF THE INVENTION

Accordingly, it is an object of this invention to overcome the above-mentioned disadvantages, and to provide a method for economically producing an automobile bumper having a good appearance and high shock-absorbing properties.

By this invention an automobile bumper is produced by a method comprising the steps of loading a preformed surface skin member into a blow mold, and then blowing a parison in the mold, thereby obtaining a hollow cushioning body firmly bonded to the surface skin member.

By the method of the invention a surface skin member is preformed by, for example, injection molding, and then loaded into a blow mold where a parison is blow-molded until it is bonded to the surface skin member, thereby providing a hollow cushioning body unitarily formed with the surface skin member. Thus, the blow molding and bonding operations are accomplished simultaneously. The injection-molded surface skin member overlays the bumper to produce a neat appearance.

PREFERRED EMBODIMENTS TO CARRY OUT THE INVENTION

Figure 1:
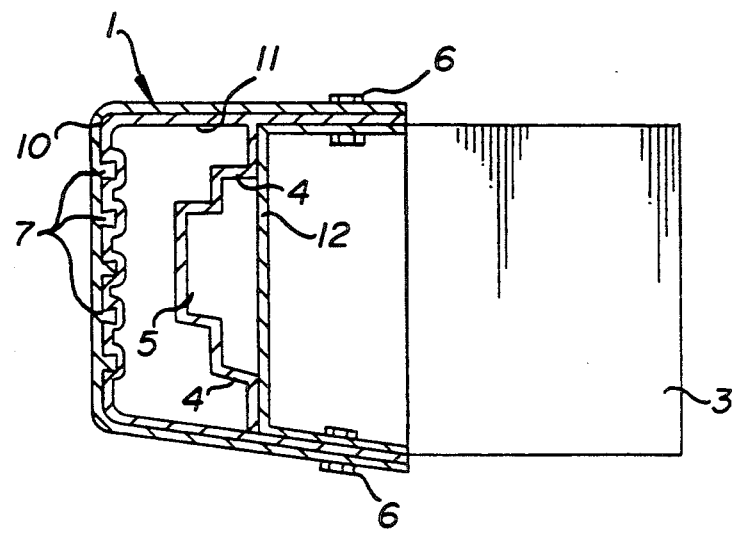
FIG. 1 is a vertical sectional side view showing an example of the automobile bumper of the invention.
Figure 2:
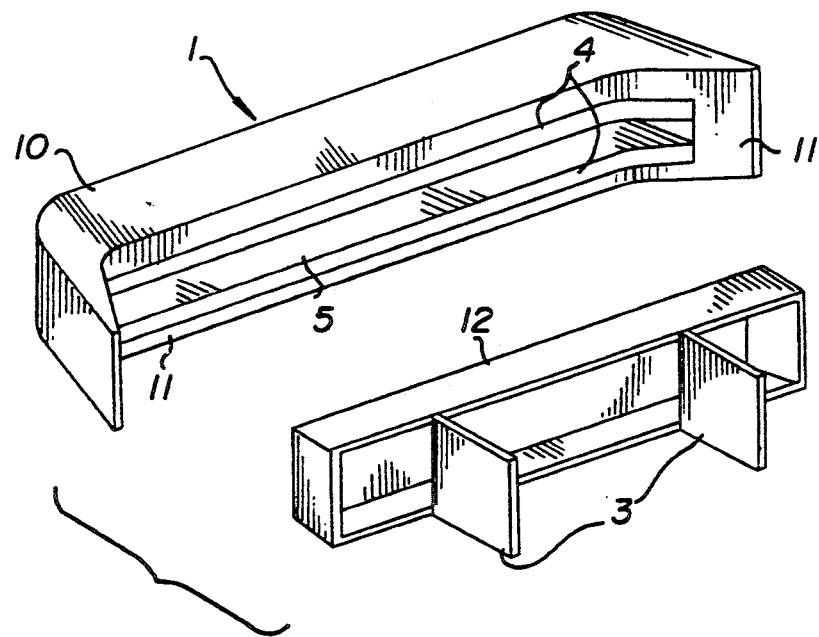
FIG. 2 is an exploded perspective view of the bumper shown in FIG. 1.

The invention is now described in more detail by reference to the following examples:

FIG. 1 is a vertical sectional side view showing an example of the automobile bumper of the invention. FIG. 2 is an exploded perspective view of the bumper shown in FIG. 1.

The automobile bumper 1 of the invention is basically made up of a hollow cushioning body 11 disposed between a surface skin member 10 and a metal reinforcement 12 to which the surface skin is fastened by bolts 6, and stays 3 adapted to fix the bumper to the car body. The surface skin member 10 is produced from a synthetic resin by sheet molding compound (SMC), injection molding, reaction injection molding (RIM), stamping, or sheet forming.

The suitable synthetic resins are thermoplastic resins, which include polypropylene (PP), high density polyethylene (HDPE), low-density polyethylene (LDPE), linear low-density polyethylene (LLDPE), polyvinyl chloride (PVC), polycarbonate (PC), nylon, polybutylene terephthalate (PBT), polyethylene terephthalate (PET), polystyrene (PS), polymethyl methacrylate (PMMA), polyoxymethylene (POM), acrylonitrile-butadiene-styrene resin (ABS), acrylonitrile-styrene copolymer (AS), ethylene-vinyl acetate copolymer (EVA), poly-4-methylpentene-1 (TPX), polyphenylene oxide (PPO), polyether sulfone (PES), polyphenylene sulfide (PPS), ethylene-propylene rubber (EPR), and ethylene-propylene-diene terpolymer (EPDM). The resins may be used singly or by blending dissimilar materials. Typical compositions include a mixture of polypropylene (PP), ethylene-propylene rubber (EPR), and high-density polyethylene (HDPE), a mixture of polypropylene (PP) and ethylene-propylene rubber (EPR), and a mixture of nylon and polypropylene (PP). The compositions may also be blended with a reinforcing filler such as glass fiber (GF), talc, mica, and calcium carbonate.

The hollow cushioning body 11 is produced, for example, by blow molding. It may have a box construction with high shock-absorbing properties. In addition, it has on its rear side recesses 5 formed by ribs 4. The body 11 is made of a thermoplastic resin capable of blow molding from a large, long parison. The thermoplastic resin is of the type used for the surface skin member 10, and it is blended with a modified polyolefin (CMP) to reduce the melt index (MI) to 0.5 or below as well as the melt flow rate (MFR) to 1.0 or below, thus holding drawdown resistance.

Figure 3:
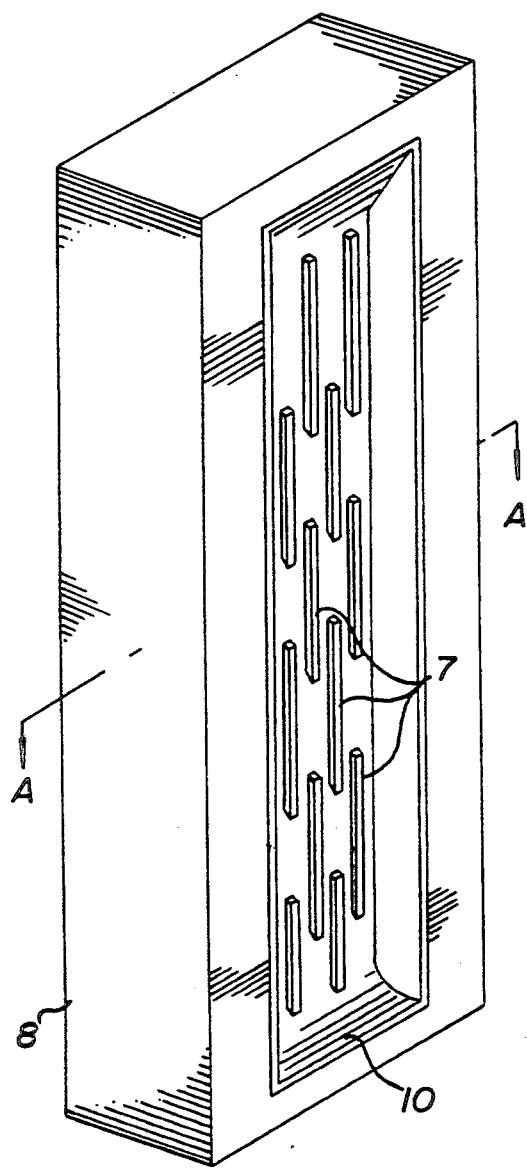
FIG. 3 is a perspective view of a blow mold with the surface skin member attached.
Figure 4:
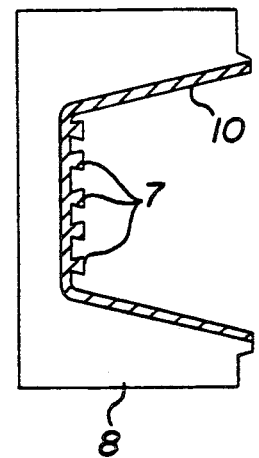
FIG. 4 is a sectional plan view of the blow mold shown in FIG. 3.
Figure 5:
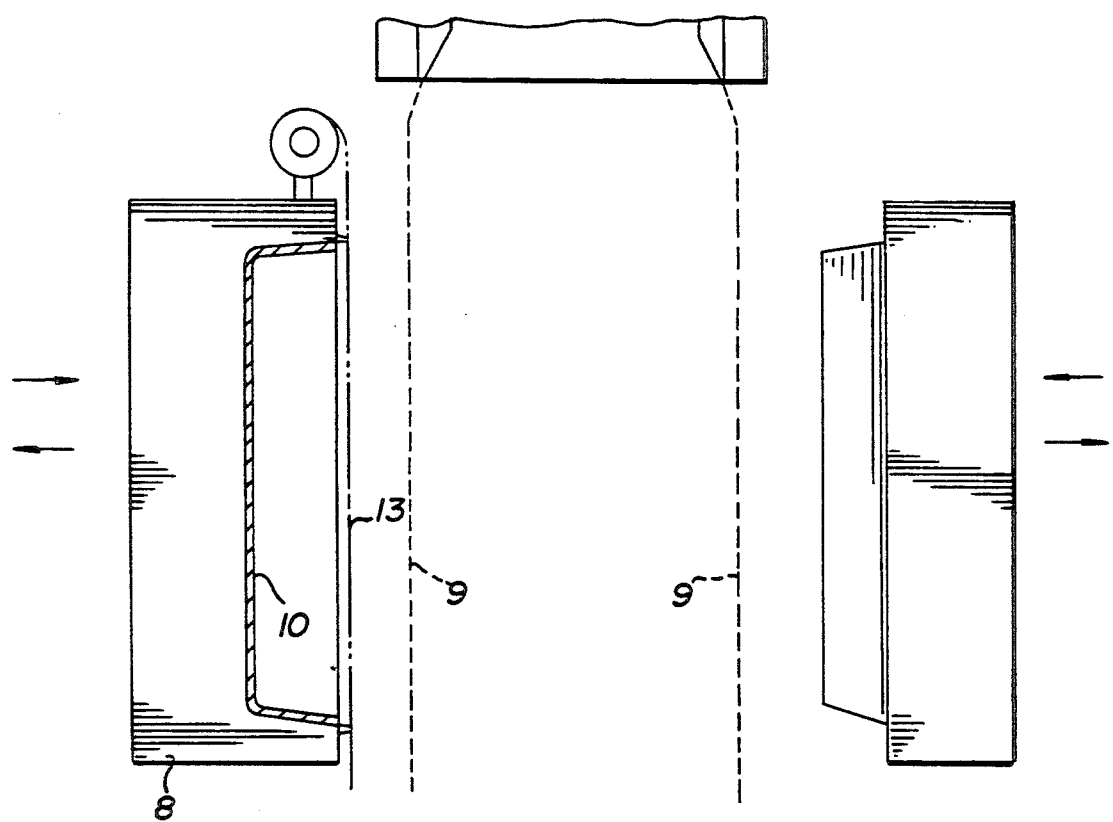
FIG. 5 is a front view, in partly vertical section, showing another example of a blow mold with the surface skin member placed in position.

The bumper of the invention is produced by the method illustrated in FIGS. 3, 4, and 5. The surface skin member 10 is first formed by injection molding the above-mentioned thermoplastic resin. The surface skin member 10 is formed on the back side with a plurality of locking ridges 7 adapted to facilitate the bonding to the hollow cushioning body 11.

The preformed surface skin member 10 is then loaded against the cavity inside surface of the blow mold 8 to be used for molding the hollow cushioning body 11. A parison 9 is then extruded and blown into a shape, until it is caused to press against the back side of the surface skin member 10 and the bonding occurs, both by fusion and mechanical means, due to the locking ridges 7 running over the skin 10. Thus there is provided the cushioning body 11 of a box construction unitarily formed with the surface skin member 10.

If required, the locking ridges 7 can be omitted. When omitted, the bonding is achieved by a fusible film 13. In this case, a film 13 of adhesive resin e.g., "tie-resin," is placed over an opening of the mold 8 before the parison 9 is extruded into the mold 8, as shown in FIG. 5. During blow molding, the film 13 serves as an insert and melts to bond the surface skin member 10 with the hollow cushioning body 11. The film 13 may be made of one of the materials used in the surface skin material 10 and the hollow cushioning body 11.

The automobile bumper 1 of the invention absorbs impact force due to the blow-molded hollow cushioning body 11 of box construction having the recesses 5 formed by the ribs 4. The automobile bumper has also a good appearance due to the injection-molded surface skin member 10 overlaying the hollow cushioning body. Thus the invention provides a bumper 1 excellent in both appearance and cushioning effects.

The following are results of an experiment conducted to confirm the effects of the invention:

The surface skin member of the bumper is first formed from a mixture of PP, EPR, and HDPE by using a large injection molding machine. A hollow cushioning body 11 measuring 1.8 m long, 0.15 m wide, and 0.08 m high is then blow-molded from high-density polyethylene (HDPE) by using a large blow molding machine (Model 1PB-200 C built by Ishikawajima-Harima Heavy Industries Co., Ltd.) while the preformed surface skin member is held inside the cavity. The resulting cushioning body is provided with a metal reinforcement as shown in FIG. 1. The sample bumper is secured to a car mock-up before a pendulum impact test is run. The pendulum is swung against the center of the bumper at about 8 km an hour, and the impact on the mock-up is then measured. The bumper of the invention had significant shock absorption, as the mock-up received an impact force of about 4 tons, or about 70% of the conventional bumper that has a cushioning body of foamed resin. The bumper of the invention has a good appearance, and equals that of the injection-molded bumper, and has broader industrial uses than a bumper prepared simply by blow molding.

INDUSTRIAL USES OF THE INVENTION

This invention provides a method for the production of an automobile bumper having a good appearance and high shockabsorbing properties. The method of the invention is economical in that the hollow cushioning body is bonded to the surface skin member during the course of blow-molding.

We claim:

1. A method for producing an automobile bumper comprising the steps of loading a preformed surface skin member of a thermoplastic resin composition preformed so as to have a smooth surface into a blow die half of a blow mold, disposing an adhesive resin film over the blow die half in which said surface-skin member has previously been loaded, and then blowing a parison, consisting essentially of a thermoplastic resin capable of blow molding, in said mold whereby the blown parison is bonded to said surface skin member so as to provide a hollow cushioning body firmly bonded to said surface skin member, wherein the surface skin member is fusion-bonded to the hollow cushioning body by the adhesive resin film therebetween.

2. A method for producing an automobile bumper as claimed in claim 1, wherein said skin member and said parison each comprise at least one of the same thermoplastic resin and said adhesive resin also comprises at least one of said same thermoplastic resin.

* * * * *

UNITED STATES PATENT AND TRADEMARK OFFICE
CERTIFICATE OF CORRECTION

PATENT NO. : 5,114,522
DATED : May 19, 1992
INVENTOR(S) : Yutaka TAKADO et al

It is certified that error appears in the above-identified patent and that said Letters Patent is hereby corrected as shown below:

On the cover page, after INID Code [76], insert

-- [73] Assignee: Tonen Sekiyukagaku K.K.,
Tokyo, Japan --

Signed and Sealed this

Twentieth Day of July, 1993

Attest:

MICHAEL K. KIRK

Attesting Officer

Acting Commissioner of Patents and Trademarks